United States Patent
Dangy-Caye (10) Patent No.: US 10,499,329 B2
(45) Date of Patent: Dec. 3, 2019

(54) DEVICE AND METHOD FOR CONFIGURING A COMMUNICATION DEVICE

(71) Applicant: SAGEMCOM BROADBAND SAS, Rueil Malmaison (FR)

(72) Inventor: Nicolas Dangy-Caye, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 127 days.

(21) Appl. No.: 15/102,048

(22) PCT Filed: Nov. 27, 2014

(86) PCT No.: PCT/EP2014/075835
§ 371 (c)(1),
(2) Date: Jun. 6, 2016

(87) PCT Pub. No.: WO2015/082309
PCT Pub. Date: Jun. 11, 2015

(65) Prior Publication Data
US 2016/0309408 A1    Oct. 20, 2016

(30) Foreign Application Priority Data

Dec. 6, 2013 (FR) ...................... 13 62232

(51) Int. Cl.
*H04W 4/00* (2018.01)
*H04W 52/02* (2009.01)
(Continued)

(52) U.S. Cl.
CPC ........ *H04W 52/0206* (2013.01); *H04W 84/12* (2013.01); *H04W 88/08* (2013.01); *H04W 92/10* (2013.01)

(58) Field of Classification Search
None
See application file for complete search history.

(56) References Cited

U.S. PATENT DOCUMENTS 8,228,849 B2 *  7/2012  Trachewsky .......... H04W 48/20
                                                  370/328
9,614,374 B2 *  4/2017  Patel .................... H02J 3/28
(Continued)

OTHER PUBLICATIONS

International Search Report and Written Opinion of the ISA for PCT/EP2014/075835, dated Feb. 11, 2015, 12 pages.
(Continued)

*Primary Examiner* — Bob A Phunkulh
(74) *Attorney, Agent, or Firm* — Nixon & Vanderhye, P.C.

(57) ABSTRACT

A device has a first radio interface for implementing a first wireless communication network and a second radio interface for implementing a second wireless communication network, said networks having separate identifiers. When no client is connected to the second wireless communication network, the device: deactivates (303) the second radio interface; implements (304) a third wireless communication network via said first radio interface, the third wireless communication network having the same identifier as the second wireless communication network. Once a client device connects to the third wireless communication network, the device reactivates the second radio interface, re-implements (306) the second wireless communication network; and cuts off (307) the third wireless communication network and switches said client device to the second wireless communication network.

14 Claims, 4 Drawing Sheets

(51) Int. Cl.
*H04W 84/12* (2009.01)
*H04W 88/08* (2009.01)
*H04W 92/10* (2009.01)

(56) References Cited

U.S. PATENT DOCUMENTS

| | | | |
|---|---|---|---|
| 2003/0207668 A1* | 11/2003 | McFarland | H03H 7/0153 455/3.01 |
| 2004/0013128 A1* | 1/2004 | Moreton | H04W 74/02 370/447 |
| 2005/0186906 A1 | 8/2005 | Hussmann | |
| 2009/0290561 A1 | 11/2009 | Kleindl | |
| 2009/0316667 A1* | 12/2009 | Hirsch | H04B 1/406 370/338 |
| 2011/0115986 A1* | 5/2011 | Takezaki | H04N 21/43637 348/734 |
| 2011/0171909 A1* | 7/2011 | Jung | H04W 48/16 455/41.2 |
| 2011/0261797 A1* | 10/2011 | Yamaguchi | H04W 72/048 370/338 |
| 2012/0243474 A1* | 9/2012 | Iyer | H04L 63/1466 370/328 |
| 2012/0262217 A1* | 10/2012 | Gorbachov | H01P 1/15 327/382 |
| 2012/0300759 A1* | 11/2012 | Patanapongpibul | H04W 48/14 370/338 |
| 2013/0010719 A1* | 1/2013 | Shapira | H04W 72/082 370/329 |
| 2013/0122956 A1* | 5/2013 | Lee | H04W 52/04 455/522 |
| 2013/0171941 A1* | 7/2013 | Kenney | H04W 76/14 455/62 |
| 2013/0315141 A1* | 11/2013 | Homchaudhuri | H04W 88/06 370/328 |
| 2014/0119252 A1* | 5/2014 | Kella | H04W 52/0216 370/311 |
| 2014/0177548 A1* | 6/2014 | Aihara | H04W 72/02 370/329 |
| 2014/0269468 A1* | 9/2014 | Jia | H04W 24/02 370/311 |
| 2015/0036760 A1* | 2/2015 | Pang | H04B 7/0413 375/267 |
| 2015/0289276 A1* | 10/2015 | Goussard | H04W 52/245 370/252 |
| 2016/0050683 A1* | 2/2016 | Gupta | H04W 24/02 370/329 |

OTHER PUBLICATIONS

Behcet Sarikaya, "Draft Technical Requirements; 21-08-0008-01-mrpm-draft-technical-requirements", IEEE Draft, vol. 802.21, No. 1, Jan. 28, 2008, pp. 1-17.

* cited by examiner

DEVICE AND METHOD FOR CONFIGURING A COMMUNICATION DEVICE

This application is the U.S. national phase of International Application No. PCT/EP2014/075835 filed 27 Nov. 2014, which designated the U.S. and claims priority to FR Patent Application No. 13/62232 filed 6 Dec. 2013, the entire contents of each of which are hereby incorporated by reference.

The present invention relates to a device having a first radio interface for implementing a first wireless communication network and a second radio interface for implementing a second wireless communication network, and relates more particularly to a mechanism for preserving resources when implementing such wireless communication networks.

Many items of equipment intended to implement wireless communication networks have a dual radio interface, enabling in particular to perform wireless communications on distinct frequency bands. For example, many residential gateways at the present time offer a dual Wi-Fi (registered trade mark) interface enabling establishing wireless communication networks both in the 2.4 GHz frequency band, as defined by the IEEE standards 802.11b/g/n, and in the 5 GHz frequency band as defined by the IEEE standards 802.11a/n/ac. It is usual to use the 2.4 GHz frequency band for Internet traffic and the 5 GHz frequency band for premium traffic, such as for example audiovisual data.

The counterpart of making available a dual radio interface is an increased consumption of energy and more generally of processing resources and/or memory resources. Such increased consumption is in particular due to a very low efficiency of power amplifiers, to using multichannel listening and to the overall consumption of radio interfaces. It should moreover be noted that such radio interfaces are often equipped with a supplementary processor ("offloading processor") intended to offload a main processor of the device with regard to the management of said radio interface.

Optimisation of the energy consumption of such radio interfaces is generally achieved by a fallback of the MIMO (multiple input multiple output) systems from N×N (N>1) to 1×1; this technique is referred to as "One Channel Listening" or "+Green Access Point". This technique may be supplemented by cyclic cut-off of the radio interface (referred to as "doze mode"), the on/off duty factor of which affords additional saving in energy while keeping listening capacity for client devices that would wish to connect to a communication network managed by said device.

Such techniques do however not enable achieving sufficient energy savings, and more generally savings on processing resources and/or memory resources. It is desirable to overcome these drawbacks of the prior art. It is in particular desirable to provide a solution that allows reducing energy consumption, and more generally the consumption of processing resources and/or memory resources, of a device intended to implement wireless communication networks and for this purpose having a dual radio interface.

The invention relates to a method implemented by a device having a first radio interface for implementing a first wireless communication network and a second radio interface for implementing a second wireless communication network, the first and second wireless communication networks having separate identifiers, characterised in that, when no client device is connected to the second wireless communication network, the device implements an economic mode by performing the following steps: deactivating the second radio interface; implementing a third wireless communication network via said first radio interface, the third wireless communication network having the same identifier as the second wireless communication network. And, once a client device connects to the third wireless communication network, the device further performs the following steps: reactivating the second radio interface and re-implementing the second wireless communication network; and cutting off the third wireless communication network and switching said client device to the second wireless communication network. Thus, by deactivating the second radio interface, resources (e.g. energy resources) are preserved. In addition, through the implementation of the third wireless communication network, the device still listens out for client devices that would wish to connect to the second wireless communication network that was cut off following deactivation of the second radio interface.

According to a particular embodiment, the first radio interface is adapted for implementing wireless communication networks in a first frequency band and the second radio interface is adapted for implementing wireless communication networks in a second frequency band distinct from the first frequency band.

According to a particular embodiment, the first radio interface is in accordance with the Wi-Fi standard in the 2.4 GHz frequency band and the second radio interface is in accordance with the Wi-Fi standard in the 5 GHz frequency band.

According to a particular embodiment, said device increases, for the time that said client device switches to the second wireless communication network, a quantity of memory resources allocated to the processing of the exchanges with the client device.

According to a particular embodiment, the device implements the economic mode only after having detected that no client device has been connected to the second wireless communication network for a period of time of predefined duration.

According to a particular embodiment, said device decides to implement the economic mode according to capabilities of client devices eventually caused to connect to said device via one said wireless communication network, said capabilities relating to a compatibility of said client devices with said first and second radio interfaces.

According to a particular embodiment, when a new client device connects to the first wireless communication network, said device performs the following steps: storing information indicating that the new client device is compatible with the first radio interface; implementing a fourth wireless communication network via the second radio interface, the fourth wireless communication network having the same identifier as the first wireless communication network; cutting off the first wireless communication network and switching said client device to the fourth wireless communication network; and storing information indicating that the new client device is compatible with the second radio interface, when said client device switches to the fourth wireless communication network.

According to a particular embodiment, said device implements the fourth wireless communication network when only one or more new client devices are connected to the first wireless communication network.

According to a particular embodiment, when a new client device connects to the second wireless communication network, said device performs the following steps: storing information indicating that the new client device is compatible with the second radio interface; implementing the third wireless communication network via the first radio interface;

cutting off the second wireless communication network and switching said client device to the third wireless communication network; and storing information indicating that the new client device is compatible with the first radio interface, when said client device switches to the third wireless communication network.

According to a particular embodiment, said device implements the third wireless communication network to switch said new client device when only one or more new client devices are connected to the second wireless communication network.

According to a particular embodiment, for switching a client device from one wireless communication network to an other wireless communication network, said device sends to said client device a message inviting said client device to connect to the wireless communication network identified by an identifier of said other wireless communication network.

The invention also relates to a device having a first radio interface for implementing a first wireless communication network and a second radio interface for implementing a second wireless communication network, the first and second wireless communication networks having separate identifiers. When no client device is connected to the second wireless communication network, the device implements the following means: means for deactivating the second radio interface; and means for implementing a third wireless communication network via said first radio interface, the third wireless communication network having the same identifier as the second wireless communication network. And, once a client device connects to the third wireless communication network, the device implements the following means: means for reactivating the second radio interface and re-implementing the second wireless communication network; and means for cutting off the third wireless communication network and switching said client device to the second wireless communication network.

The features of the invention mentioned above, as well as others, will emerge more clearly from a reading of the following description of an example embodiment, said description being given in relation to the accompanying drawings, among which.

To allow reducing energy consumption, and more generally the consumption of processing resources and/or memory resources, of a device implementing a first wireless communication network via a first radio interface and a second wireless communication network via a second radio interface, it is proposed that said device deactivates the second radio interface when no client device is connected to the second wireless communication network and creates, via the first radio interface, an other communication network having the same identifier as the one previously used by the second wireless communication network. The first radio interface thus enables listening out for client devices that would wish to connect to the second wireless communication network, while reducing the consumption relating to the second radio interface. When a client device connects to this other communication network, the device reactivates the second radio interface so as to enable establishing the second wireless communication network and switches the client device to the second wireless communication network. Continuity of services implemented via the second communication network is thus ensured.

Figure 1:
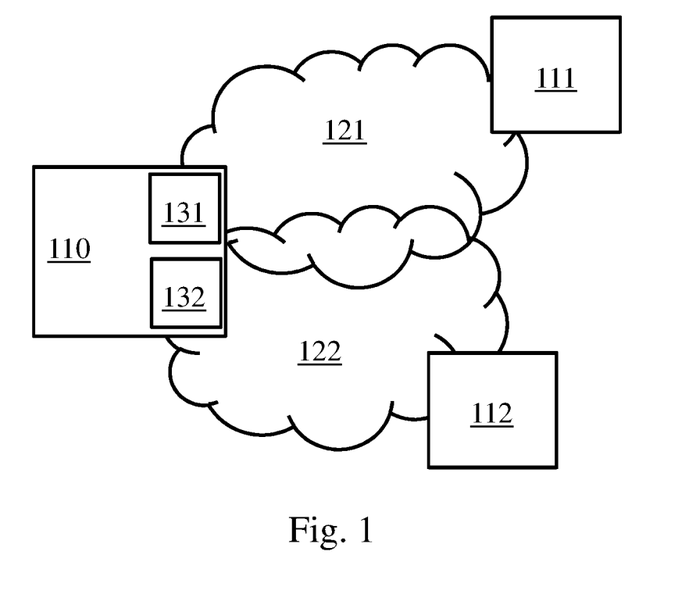
FIG. 1 schematically illustrates a wireless communication system in which the present invention may be implemented.

FIG. 1 schematically illustrates a communication system in which the present invention may be implemented.

The communication system comprises a device 110 adapted for enabling implementation of wireless communication networks. The device 110 is for example an access point or a residential gateway including the functionalities of an access point.

The device 110 comprises a first radio interface 131 and a second radio interface 132. The device 110 is thus adapted for being able to implement at least one separate wireless communication network via each of the first 131 and second 132 radio interfaces. Each wireless communication network implemented by the device 110 is identified by a respective identifier.

In a particular embodiment, the first radio interface 131 enables implementing wireless communication networks in a first frequency band and the second radio interface 132 enables implementing wireless communication networks in a second frequency band distinct from the first frequency band.

According to a preferential embodiment, the first radio interface 131 is compatible with the Wi-Fi (registered trade mark) standard in the 2.4 GHz frequency band and the second radio interface 132 is compatible with the Wi-Fi (registered trade mark) standard in the 5 GHz frequency band. Each wireless communication network implemented via these radio interfaces is then associated with an SSID (Service Set IDentifier) identifier. This SSID identifier is periodically sent by the device 110 via the relevant radio interface in a beacon signal serving to indicate that the device 110 is providing the means for using a wireless communication network identified by the SSID identifier.

Two wireless communication networks are thus depicted in FIG. 1. The device 110 provides the means for implementing, via the first radio interface 131, a first wireless communication network 121 to which a first client device 111 compatible with the first radio interface 131 is connected. It is also said that the client device 111 is connected to the device 110 via the first wireless communication network 121. The device 111 is termed client in that said device 111 benefits from the services of implementation of wireless communication networks of the device 110. The device 110 also provides the means for implementing, via the second radio interface 132, a second wireless communication network 122 to which a second client device 112 compatible with the second radio interface 132 is connected. It is also said that the client device 112 is connected to the device 110 via the second wireless communication network 122. The device 112 is also termed client in that said device 112 benefits from the services of implementation of wireless communication networks of the device 110. A client device is termed compatible with a radio interface when said client device implements the same radio technology as that implemented by the device 110 via said radio interface, thus enabling said client device to communicate with the device 110 via said radio technology.

Each of the radio interfaces may comprise a processor and/or memory dedicated to the implementation of transmissions via said radio interface.

The device 110 may implement an energy and/or resource saving mode, referred to as ECO mode, as described in detail below. When ECO mode is used, the second radio interface is deactivated when no client device is connected to the second wireless communication network, the first radio interface then being configured so as to listen out for client devices that would wish to connect to the second wireless communication network.

Figure 2:
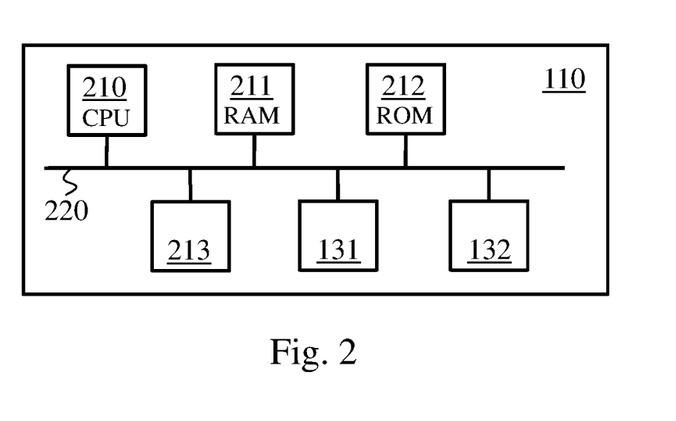
FIG. 2 schematically illustrates an example of hardware architecture of a device, of the system of FIG. 1, for implementing wireless communication networks.

FIG. 2 schematically illustrates an example of hardware architecture of the device 110. The device 110 then comprises, connected by a communication bus 220: a processor or CPU (Central Processing Unit) 210; a random access memory RAM 211; a read only memory ROM 212; a storage unit or storage medium reader, such as an SD (Secure Digital) card reader 213 or a hard disk drive HDD; the first radio interface 131 for implementing at least the first wireless communication network; and the second radio interface 132 for implementing at least the second wireless communication network.

The processor 210 is capable of executing instructions loaded into the RAM 211 from the ROM 212, from an external memory (not shown), from a storage medium, or from a communication network. When the device 110 is powered up, the processor 210 is capable of reading instructions from the RAM 211 and executing them. These instructions form a computer program causing the implementation, by the processor 210, of all or some of the algorithms and steps described below.

Thus all or some of the algorithms and steps described below may be implemented in software form by the execution of a set of instructions by a programmable machine, such as a DSP (digital signal processor) or a microcontroller.

All or some of the algorithms and steps described below may also be implemented in hardware form by a machine or a dedicated component, such as an FPGA (Field-Programmable Gate Array) or an ASIC (Application-Specific Integrated Circuit).

Figure 3:
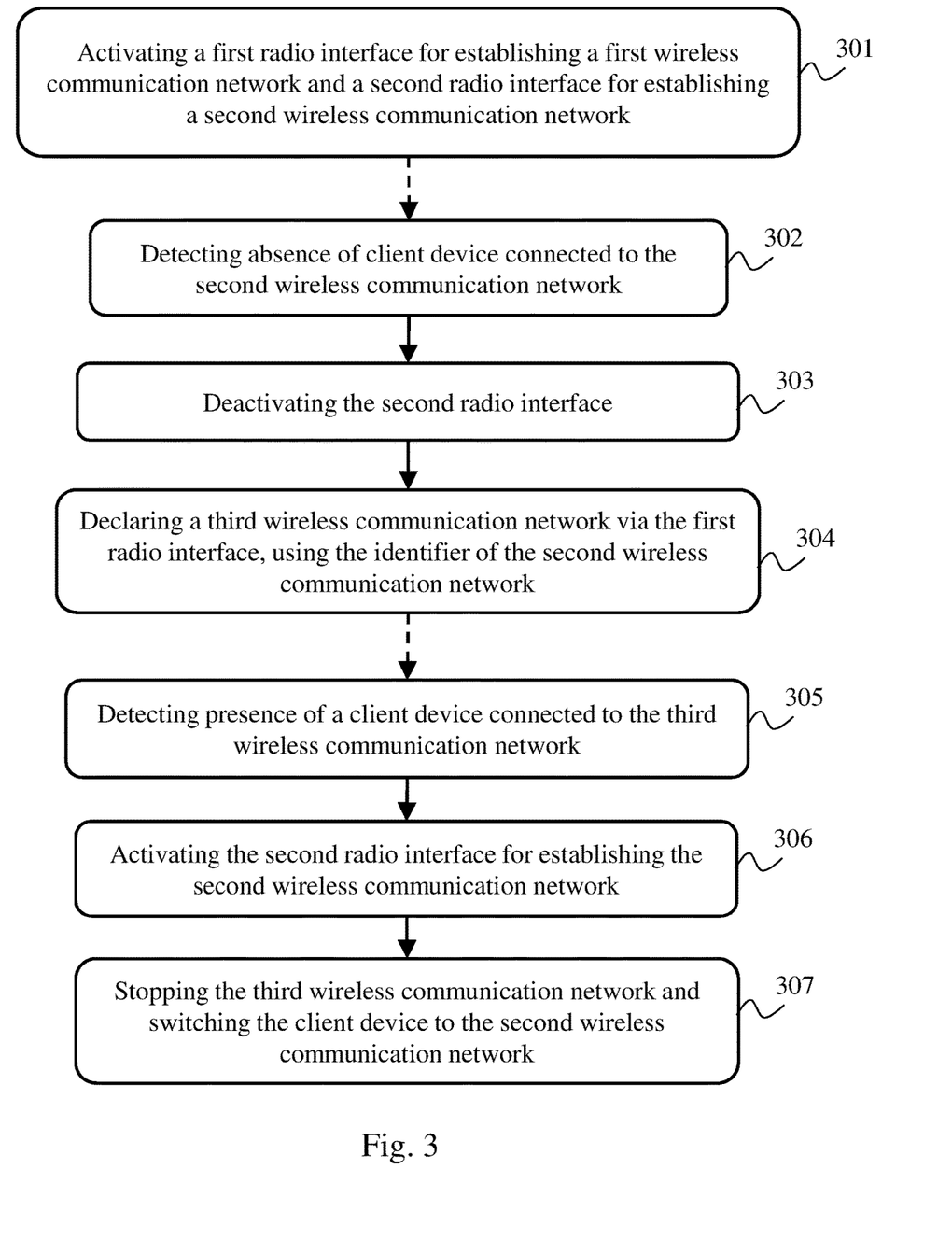
FIG. 3 schematically illustrates an algorithm for configuring said device in the context of an operating mode referred to as ECO mode.

FIG. 3 schematically illustrates an algorithm for configuration of the device 110, so as to allow reducing the energy and/or resource consumption thereof, while ensuring continuity of access to the services of the wireless communication networks.

In a step 301, the device 110 activates the first radio interface 131, thus enabling establishing the first wireless communication network 121, and activates the second radio interface 132, thus enabling establishing the second wireless communication network 122. Compatible client devices can thus connect to the wireless communication network 121 or to the wireless communication network 122. Each of the first 121 and second 122 wireless communication networks is identified by a separate identifier. Let the identifier of the first wireless communication network 121 be called SSID1 and the identifier of the second wireless communication network 122 be called SSID2. The device 110 then generates a first beacon signal via the first radio interface 131, the first beacon signal comprising the identifier SSID1. The device 110 also generates a second beacon signal via the second radio interface 132, the second beacon signal comprising the identifier SSID2. Exchanges can then take place with the client devices connected to one or other of the wireless communication networks, the client devices relying on the first and second beacon signals sent by the device 110 to synchronise with the device 110.

In a subsequent step 302, the device 110 detects that no client device is connected to the second wireless communication network 122. In a particular embodiment, the device 110 detects that no client has been connected to the second wireless communication network 122 since a period of time of predefined duration.

In a following step 303, the device 110 deactivates the second radio interface 132. The device 110 then no longer sends any beacon signal for maintaining the second wireless communication network 122 and the second wireless communication network 122 disappears. Deactivation of the second radio interface 132 of the device 110 thus allows preserving resources, whether it be energy resources or processing resources and/or memory resources. Indeed deactivating the second radio interface 132 avoids having to allocate processing resources and/or memory resources to activities relating to the maintenance of a wireless communication network to which no client device is connected.

In a following step 304, the device 110 declares a third wireless communication network (not shown in FIG. 1) via the first radio interface 131, in replacement for the second wireless communication network 122, which disappeared during the step 303. The device 110 reuses, for this third wireless communication network, the same identifier as the one previously used for identifying the second wireless communication network 122 that disappeared during the step 303. The device 110 then sends a third beacon signal via the first radio interface 131, the third beacon signal comprising the identifier SSID2. In other words, the device 110 relies on the first radio interface 131 for continuing listening out for client devices wishing to connect to the second wireless communication network 122, and for thus economising on resources relating to the second radio interface 132 of said device 110. Exchanges can then continue to take place with the client devices connected to the first wireless communication network 121, said client devices relying on the first beacon signal sent by the device 110 for synchronising with the device 110.

In a subsequent step 305, the device 110 detects that a client device is connecting to the third wireless communication network. Let us consider that the device 110 detects that the client device 112 connects to the third wireless communication network.

In a following step 306, the device 110 reactivates the second radio interface 132, which enables re-establishing the second wireless communication network 122. The client device 112 is then still connected to the third wireless communication network established via the first radio interface 131.

Once the second radio interface 132 is reactivated, in a following step 307, the device 110 stops sending the third beacon signal, which causes disappearance of the third wireless communication network. The device 110 reactivates the transmission of the second beacon signal via the second radio interface 132, the second beacon signal comprising the identifier SSID2, and the device 110 switches the client device 112 from the third wireless communication network to the second wireless communication network 122.

Various embodiments can be implemented for switching the client device 112 from the third wireless communication network to the second wireless communication network 122.

According to a first embodiment, the disappearance of the third wireless communication network and the reestablishment of the second wireless communication network 122 means that the client device 112 is going to detect the second beacon signal comprising the identifier SSID2. This identifier SSID2 being the same as that of the third wireless communication network, the client device 112 is then going to connect to the second wireless communication network 122.

According to a second embodiment, the device 110 sends, via the first radio interface 131, through the third communication network, a message inviting the client device to connect to the wireless communication network identified by the identifier SSID2, stops immediately after the implementation of the third wireless communication network and reactivates the implementation of the second wireless communication network 122. The expression "immediately after" shall be understood as "in a sufficiently short time for the client device not to have the time to consider that said client device is already connected to the wireless communication network identified by the identifier SSID2". For example, the device 110 implements the IEEE standard 802.11v and sends to the client device 112 a message recommending the client device 112 to connect to the communication network having the identifier SSID2.

According to a particular embodiment, use of the IEEE standard 802.11r by the device 110 and the client device 112 allows rapid and seamless reconnection to the second wireless communication network 122.

According to a particular embodiment, the device 110 increases, for the time that the client device 112 switches to the second wireless communication network 122, an amount of memory resources allocated to the processing of the exchanges with the client device 112. For example, the device 110 performs a temporary allocation for longer queues for absorbing the time for disconnecting and reconnecting the client device 112.

The mechanism described above in relation to FIG. 3 assumes that the client device eventually caused to connect to the second wireless communication network are, in addition to being compatible with the second radio interface 132, compatible with the first radio interface 131. It may happen however that the device 110 may be in presence of client devices solely compatible with the second radio interface 132 and not with the first radio interface 131. It would then be advantageous to enable the stoppage of the second radio interface 132 only when the client devices eventually caused to connect to the second wireless communication network are compatible with the first radio interface 131 and with the second radio interface 132. In other words, it would be advantageous to enable the device 110 to use the ECO mode only when the client devices eventually caused to connect to the second wireless communication network are compatible with the first radio interface 131 and with the second radio interface 132.

In a first embodiment, the device 110 is a residential gateway provided by an Internet access provider operator. The Internet access provider operator has then implemented an infrastructure enabling, via the Internet, configuring any residential gateway that the Internet access provider operator has provided. The protocol TR-069, also referred to as the CWMP (Customer Premises Equipment Wide Area Network Management Protocol) may be used for this purpose. The device 110 is then adapted for receiving configuration information coming from the infrastructure of said operator, the configuration information then indicating whether or not the device 110 is enabled to use the ECO mode. Said operator could prevent the device 110 from using the ECO mode, when a user of said residential gateway purchases or declares that he has purchased an item of equipment, eventually caused to connect to said residential gateway, compatible only with the second radio interface 132 and not with the first radio interface 131. In the same way, said operator may enable the device 110 to use the ECO mode, when the user of said residential gateway purchases or declares that he has purchased only equipment, eventually caused to connect to said residential gateway, compatible both with the second radio interface 132 and with the first radio interface 131.

In a second embodiment, the device 110 is equipped with a display adapted for displaying a graphical user interface (GUI) enabling configuring the device 110 in order to enable or not the use of the ECO mode. A skilled user can then configure the device 110 according to the compatibility or not of the devices, which the user has purchased and which are eventually caused to connect to said device 110, with the first radio interface 131 and with the second radio interface 132.

In a third embodiment, the device 110 is adapted for determining dynamically whether said device 110 is enabled to use the ECO mode. This aspect is detailed hereinafter in relation to FIGS. 4 to 6.

Figure 4:
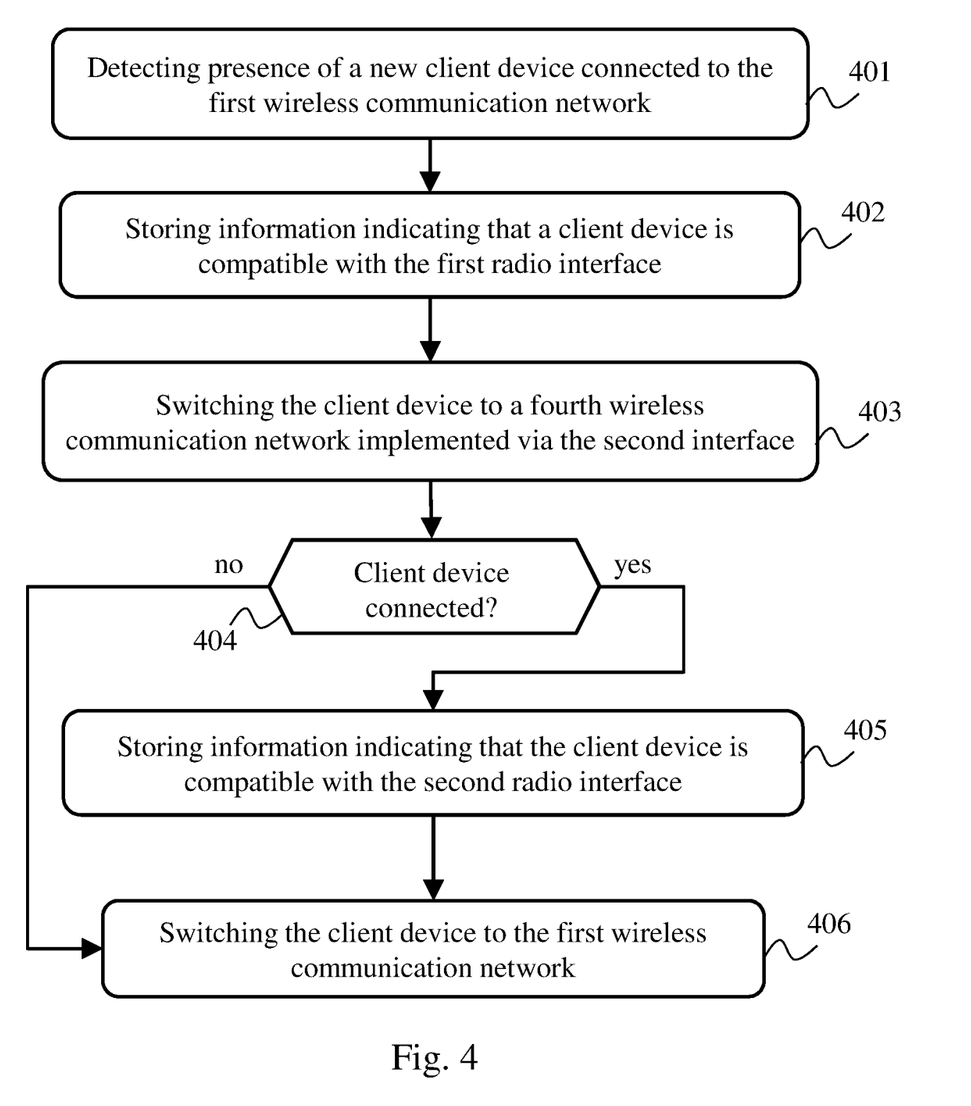
FIG. 4 schematically illustrates a first algorithm for detecting client devices capabilities.

FIG. 4 schematically illustrates a first algorithm, implemented by the device 110, for detecting capabilities of client devices. This first algorithm aims to enable the device 110 to determine the capabilities of a client device connecting first to a wireless communication network established via the first radio interface 131.

In a step 401, the device 110 detects a new client device connecting to the first communication network 121, meaning a client device for which the device 110 does not until then know whether said client device is compatible with the first radio interface 131.

In a following step 402, the device 110 stores, in a table of capabilities, information indicating that the client device is compatible with the first radio interface 131. This information is stored by the device 110 in association with an identifier of the client device. The table of capabilities is an example of storage enabling storing information relating to the capabilities of the client device vis-à-vis the first 131 and second 132 radio interfaces and optionally information relating to the switching capabilities of the client devices from a wireless communication network established via the first radio interface and another wireless communication network established via the second radio interface.

The device 110 may check whether the table of capabilities indicates that the client device is compatible with the second radio interface 132. If such is the case, the device 110 may stop the execution of the algorithm in FIG. 4. The device 110 may also wish to check, even if said device 110 now knows that the client device is compatible with the second radio interface 132, whether said client device accepts being switched from a wireless communication network established via the first radio interface 131 to another wireless communication network established via the second radio interface 132. In this case, the device 110 continues execution of the algorithm in FIG. 4.

In a following step 403, the device 110 implements a fourth wireless communication network (not shown in FIG. 1) via the second radio interface 132, reusing the identifier of the first wireless communication network 121, meaning the identifier SSID1 in the example already mentioned. The device 110 stops the first wireless communication network 121 and switches the client device to the fourth wireless communication network. The switching takes place as already described in relation to FIG. 3. It is not necessary, during this phase, to deactivate the first radio interface 131; stopping the sending of the first beacon signal suffices.

In a following step 404, the device 110 checks whether the client device has connected to the fourth wireless communication network. If such is the case, a step 405 is performed; otherwise a step 406 is performed.

In the step 405, the device 110 stores, in the table of capabilities, information indicating that the client device is compatible with the second radio interface 132. This information is stored by the device 110 in association with the identifier of the client device. Next, the step 406 is performed.

Indeed the device 110 may consider by itself to be allowed to use ECO mode, when the device 110 has determined that any detected client device is compatible both with said first radio interface 131 and with said second radio interface 132. In a variant embodiment, the device 110 may consider that it is allowed to use ECO mode when the device 110 has determined that any detected client device is able to switch from a wireless communication network established via said first radio interface 131 to another wireless communication network established via said second radio interface 132. In this case, in the step 405, the device 110 stores, in the table of capabilities, information indicating that the client device accepts being switched from a wireless communication network established via the first radio interface 131 to another wireless communication network established via the second radio interface 132. In other words, the device 110 then knows that, if required, said device 110 can subsequently implement the step 307 vis-à-vis this client device.

In the step 406, the device 110 stops the fourth wireless communication network, re-implements the first wireless communication network and switches the client device to the first wireless communication network again. The switching takes place as already described in relation to FIG. 3. If the client device had not been able to switch to the fourth wireless communication network, said client device shall reconnect to the first wireless communication network, when said first wireless communication network is re-implemented by the device 110. Indeed the client device is then going to receive the first beacon signal, which enables it to resynchronise with the device 110.

In a particular embodiment, the device 110 implements the steps 403 to 406 only when the concerned client device or devices are alone connected to the device 110 via the first wireless communication network 121. Thus the device 110 avoids disturbing other client devices connected to the device 110 via the first wireless communication network 121 and for which the device 110 has already been able to complete the table of capabilities.

Figure 5:
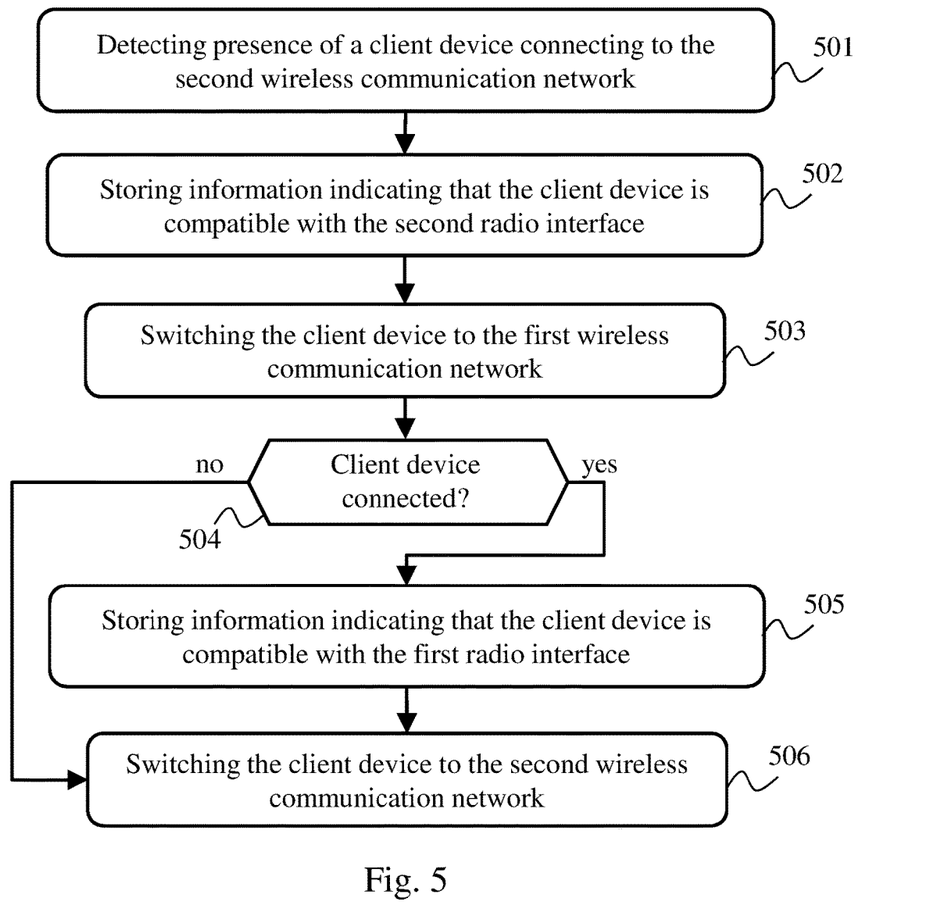
FIG. 5 schematically illustrates a second algorithm for detecting client devices capabilities.

FIG. 5 schematically illustrates a second algorithm, implemented by the device 110, for detecting capabilities of client devices. This second algorithm aims to enable the device 110 to determine the capabilities of a client device connecting first to a wireless communication network established via the second radio interface 132.

In a step 501, the device 110 detects a new client device connecting to the second communication network 122, meaning a client device for which the device 110 did not until then know whether said client device is compatible with the second radio interface 132.

In a following step 502, the device 110 stores, in the table of capabilities, information indicating that the client device is compatible with the second radio interface 132. This information is stored by the device 110 in association with the identifier of the client device.

The device 110 may check whether the table of capabilities indicates that the client device is compatible with the first radio interface 131. If such is the case, the device 110 may stop the execution of the algorithm in FIG. 5. The device 110 may also wish to check, even if said device 110 now knows that the client device is compatible with the first radio interface 131, whether said client device accepts being switched from a wireless communication network established via the first radio interface 131 to another wireless communication network established via the second radio interface 132. In this case, the device 110 continues execution of the algorithm in FIG. 5.

In a following step 503, the device 110 implements the third wireless communication network via the first radio interface 131, reusing the identifier of the second wireless communication, meaning the identifier SSID2 in the example already mentioned. The device 110 stops the second wireless communication network and switches the client device to the third wireless communication network. The switching takes place as already described in relation to FIG. 3. It is not necessary during this phase to deactivate the second radio interface 132; stopping the sending of the second beacon signal suffices.

In a following step 504, the device 110 checks whether the client device has connected to the third wireless communication network. If such is the case, a step 505 is performed; otherwise a step 506 is performed.

In the step 505, the device 110 stores, in the table of capabilities, information indicating that the client device is compatible with the first radio interface. This information is stored by the device 110 in association with the identifier of the client device. Next, the step 506 is performed.

In the step 506, the device 110 stops the third wireless communication network, re-implements the second wireless communication network 122 and switches the client device to the second wireless communication network 122 again. The switching takes place as already described in relation to FIG. 3. If the client device had not been able to switch to the third wireless communication network, said client device shall reconnect to the second wireless communication network 122, when said second wireless communication network 122 is re-implemented by the device 110. Indeed the client device then receives the second beacon signal, which enables it to synchronise with the device 110.

As already mentioned, the device 110 may consider that it is allowed to use the ECO mode when the device 110 has determined that every detected client device is compatible both with said first radio interface 131 and with said second radio interface 132. In a variant embodiment, the device 110 may consider that it is allowed to use the ECO mode when the device 110 has determined that every client device detected is able to switch from a wireless communication network established via the first radio interface 131 to another wireless communication network established via the second radio interface 132. In this case, after implementing the steps 505 and 506, the device 110 stores, in the table of capabilities, information indicating that the client device accepts switching from a wireless communication network established via the first radio interface 131 to another wireless communication network established via the second radio interface 132. In another variant embodiment, when the behaviours vis-à-vis the switching are supposed to be symmetrical from the point of view of the client devices, the device 110 may consider being allowed to use the ECO mode when the device 110 has determined that every detected client device is able to switch from a wireless communication network established via the second radio interface 132 to another wireless communication network established via the first radio interface 131. In this case, the device 110 stores, at the step 505, the information indicating that the client device accepts being switched from a wireless communication network established via the first radio interface 131 to another wireless communication network established via the second radio interface 132.

The information vis-à-vis the capabilities of the client devices that were stored during the execution of the algorithms in FIGS. 4 and 5 are preferentially associated with a timer of predefined duration. The timer is reinitialised when the concerned client device is detected by the device 110 as connected to a wireless communication network established by the device 110 via the first radio interface 131 and/or a wireless communication network established by the device 110 via the second radio interface 132. When the client device is not connected to any such wireless communication network established by the device 110, the timer elapses. When the timer has elapsed, the client device is no longer considered by the device 110 as being eventually caused to connect to the device 110 and the information vis-à-vis the capabilities of said client device that were stored during execution of the algorithms in FIGS. 4 and 5 is then deleted. If said client device is subsequently caused to connect to the device 110, then said client device is considered to be a new client device by the device 110.

In a particular embodiment, the device 110 may subsequently attempt again to switch, from a wireless communication network established via the first radio interface 131 to another wireless communication network established via the second radio interface 132, or vice versa, a client device previously identified as not supporting such switching.

In a particular embodiment, the device 110 implements the steps 503 to 506 only when solely the client device or devices concerned are connected to the device 110 via the second wireless communication network 122. Thus the device 110 avoids disturbing other client devices connected to the device 110 via the second wireless communication network 122 and for which the device 110 has already been able to complete the table of capabilities.

Figure 6:
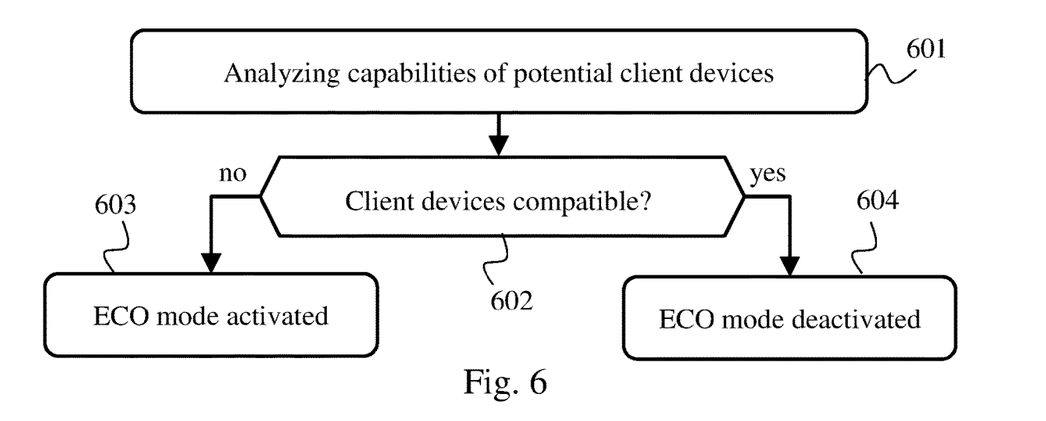
FIG. 6 schematically illustrates a decision algorithm for activating ECO mode or not, according to the capabilities of the client devices.

FIG. 6 schematically illustrates a decision algorithm for configuring the device 110, according to the capabilities of the client devices.

In a step 601, the device 110 analyses the capabilities of the client devices eventually caused to connect to the device 110. The capabilities to which reference is made here are those determined by execution of the algorithms in FIGS. 4 and 5 and which were stored in the table of capabilities.

In a following step 602, the device 110 determines whether all the client devices eventually caused to connect to the device 110 are compatible with the first radio interface 131 and with the second radio interface 132. In a variant, the device 110 determines whether all the client devices eventually caused to connect to the device 110 are capable of switching from a wireless communication network established by the device 110 via the first radio interface 131 to another wireless communication network established by the device 110 via the second radio interface 132. When all the client devices eventually caused to connect to the device 110 are compatible with the first radio interface 131 and with the second radio interface 132, or when said client devices are capable of switching from a wireless communication network established by the device 110 via the first radio interface 131 to another wireless communication network established by the device 110 via the second radio interface 132, a step 603 is performed; otherwise a step 604 is performed.

In the step 603, the device 110 activates the ECO mode. The device 110 then implements the algorithm in FIG. 3. The algorithm in FIG. 6 is then terminated.

In the step 604, the device 110 deactivates the ECO mode. The device 110 then decides not to implement the algorithm in FIG. 3.

The algorithm in FIG. 6 is preferentially implemented each time the content of the table of capabilities is updated.

Execution of the algorithm in FIG. 6 then enables the device 110 to dynamically adapt its behaviour vis-à-vis the ECO mode according to the various client devices that are eventually caused to connect to a wireless communication network established by the device 110 via the first radio interface 131 or via the second radio interface 132.

The invention claimed is:

1. A method implemented by a device configured to function as an access point, said device having a first radio interface for implementing a first wireless communication network and a second radio interface for implementing a second wireless communication network, the first and second wireless communication networks having separate identifiers, wherein
   when no client device is connected to the second wireless communication network, the device implements an economic mode by:
      deactivating the second radio interface, which results in no beacon signal being sent by the second radio interface;
      implementing a third wireless communication network via said first radio interface, the third wireless communication network having the same identifier as the second wireless communication network; and
   once a client device connects to the third wireless communication network:
      reactivating the second radio interface and re-implementing the second wireless communication network; and
      cutting off the third wireless communication network and switching said client device to the second wireless communication network.

2. The method according to claim 1, wherein the first radio interface is adapted for implementing wireless communication networks in a first frequency band and the second radio interface is adapted for implementing wireless communication networks in a second frequency band distinct from the first frequency band.

3. The method according to claim 2, wherein the first radio interface is in accordance with the Wi-Fi standard in the 2.4 GHz frequency band and the second radio interface is in accordance with the Wi-Fi standard in the 5 GHz frequency band.

4. The method according to claim 1, wherein said device, during the time that said client device switches to the second wireless communication interface, increases a quantity of memory resources allocated to the processing of the exchanges with the client device.

5. The method according to claim 1, wherein the device uses the economic mode only after having detected that no client device has been connected to the second wireless communication network during a period of time of predefined duration.

6. The method according to claim 1, wherein said device decides to use the economic mode according to capabilities of client devices eventually caused to connect to said device via a said wireless communication network, said capabilities relating to compatibility of said client devices with said first and second radio interfaces.

7. The method according to claim 6, wherein, when a new client device connects to the first wireless communication network, said device performs:

storing information indicating that the new client device is compatible with the first radio interface;

implementing a fourth wireless communication network via the second radio interface, the fourth wireless communication network having the same identifier as the first wireless communication network;

cutting off the first wireless communication network and switching the new client device to the fourth wireless communication network; and storing information indicating that the new client device is compatible with the second radio interface, when said new client device switches to the fourth wireless communication network.

8. The method according to claim 7, wherein said device implements the fourth wireless communication network to switch said new client device when only one or more new client devices are connected to the first wireless communication network.

9. The method according to claim 6, wherein, when a new client device connects to the second wireless communication network, said device performs:

storing information indicating that the new client device is compatible with the second radio interface;

implementing the third wireless communication network via the first radio interface;

cutting off the second wireless communication network and switching the new client device to the third wireless communication network; and storing information indicating that the new client device is compatible with the first radio interface, when said new client device switches to the third wireless communication network.

10. The method according to claim 9, wherein said device implements the third wireless communication network to switch said new client device when only one or more new client devices are connected to the second wireless communication network.

11. The method according to claim 1, wherein, for switching a client device from one wireless communication network to another wireless communication network, said device sends to said client device a message inviting said client device to connect to the wireless communication network identified by an identifier of said other wireless communication network.

12. A non-transitory storage medium having stored thereon a computer program, the computer program comprising instructions for performing the method according to claim 1 when the computer program is executed by a processor.

13. A device comprising
a first radio interface for implementing a first wireless communication network; and
a second radio interface for implementing a second wireless communication network, the first and second wireless communication networks having separate identifiers, wherein
the device is configured to function as an access point;
when no client device is connected to the second wireless communication network, the device implements circuitry configured for:
deactivating the second radio interface, which results in no beacon signal being sent by the second radio interface;
implementing a third wireless communication network via said first radio interface, the third wireless communication network having the same identifier as the second wireless communication network; and
the circuitry is further configured for, once a client device connects to the third wireless communication network:
reactivating the second radio interface and re-implementing the second wireless communication network; and
cutting off the third wireless communication network and switching said client device to the second wireless communication network.

14. A method implemented by a wireless access point having a first radio interface for implementing wireless communication network in a first frequency band and a second radio interface for implementing wireless communication network in a second frequency band, the method comprising:
broadcasting a first network identification for a first network with the first radio interface;
broadcasting a second network identification for a second network with the second radio interface;
after broadcasting the second network identification;
determining that no client is connected to the second network,
broadcasting the second network identification for a third network with the first radio interface, and
deactivating the second radio interface; and
after a client connects to the third network, switching the client to the second network by
reactivating the second radio interface to broadcast the second network identification for the second network with the second radio interface, and
stopping broadcast of the second network identification for the third network with the first radio interface.

* * * * *